*(12)* United States Patent
Watanabe

*(10)* Patent No.: US 11,656,435 B2
*(45)* Date of Patent: May 23, 2023

*(54)* IMAGING LENS AND CAMERA MODULE

*(71)* Applicant: TOKYO VISIONARY OPTICS CO., LTD., Tokyo (JP)

*(72)* Inventor: Hiroshi Watanabe, Sukagawa (JP)

*(73)* Assignee: TOKYO VISIONARY OPTICS CO., LTD., Tokyo (JP)

( * ) Notice: Subject to any disclaimer, the term of this patent is extended or adjusted under 35 U.S.C. 154(b) by 228 days.

*(21)* Appl. No.: 16/681,068

*(22)* Filed: Nov. 12, 2019

*(65)* Prior Publication Data

US 2020/0285029 A1 Sep. 10, 2020

Related U.S. Application Data

*(63)* Continuation of application No. 16/359,569, filed on Mar. 20, 2019, now abandoned.

*(30)* Foreign Application Priority Data

Mar. 20, 2018 (JP) .............................. JP2018-051951

*(51)* Int. Cl.
*G02B 13/00* (2006.01)
*G02B 9/60* (2006.01)
*G02B 7/02* (2021.01)
*H04N 5/225* (2006.01)

*(52)* U.S. Cl.
CPC ......... *G02B 13/0045* (2013.01); *G02B 7/021* (2013.01); *G02B 7/026* (2013.01); *G02B 9/60* (2013.01); *H04N 5/2254* (2013.01)

*(58)* Field of Classification Search
CPC ................................................. G02B 13/0045
See application file for complete search history.

*(56)* References Cited

U.S. PATENT DOCUMENTS

| 2019/0174032 | A1* | 6/2019 | Yang | ................... G02B 7/021 |
| 2019/0179098 | A1* | 6/2019 | Yang | ................... H04N 5/2254 |
| 2019/0179103 | A1* | 6/2019 | Yang | ................... G02B 7/026 |
| 2019/0235140 | A1* | 8/2019 | Chou | ................... G02B 7/021 |
| 2019/0346650 | A1* | 11/2019 | Yang | ................... G02B 7/02 |

FOREIGN PATENT DOCUMENTS

JP 2015-079175 A 4/2015

* cited by examiner

*Primary Examiner* — Ephrem Z Mebrahtu
*(74) Attorney, Agent, or Firm* — Hamre, Schumann, Mueller & Larson, P.C.

*(57)* ABSTRACT

An imaging lens is provided that secures a space in a device by partially notching an outline of a lens barrel, which used to be in a cylindrical shape in the past, and is less likely to cause performance degradation due to assembly error. An imaging lens includes: a lens provided with an effective optical surface and an edge region formed surrounding the effective optical surface and formed by injection molding of a plastic material; and a lens barrel configured to accommodate and hold the lens, wherein the lens has the edge region with an outline formed in a polygonal shape, the lens barrel has an inner circumferential surface with at least one linear portion formed in a position to accommodate the lens, the at least one linear portion corresponding to at least one linear portion formed in an outline of the lens, and the lens barrel has an outline with a linear portion formed parallel to the linear portion formed in the inner circumferential surface of the lens barrel.

8 Claims, 10 Drawing Sheets

IMAGING LENS AND CAMERA MODULE

The present application is based on and claims priority of a Japanese patent application No. 2018-051951 filed on Mar. 20, 2018, the entire contents of which are hereby incorporated by reference.

BACKGROUND OF THE INVENTION

Field of the Invention

The present invention relates to an imaging lens used for imaging devices.

Description of the Related Art

In recent years, various products including information terminal devices have been provided with a camera function.

A camera mounted in such a device is expected to allow downsizing of the device.

Imaging lenses targeted for downsizing in the past include an imaging lens as in JP 2015-79175 A.

JP 2015-79175 A discloses an imaging unit, including: a CMOS image sensor; an imaging lens composed of a plurality of lenses to take an object image; a substrate configured to support the image sensor and to send and receive an electrical signal thereof; and a lens barrel having an opening for light incident from an object side and made of a light shielding member, wherein the CMOS image sensor, the imaging lens, the substrate, and the lens barrel are formed integrally.

SUMMARY

In the imaging lens described in JP 2015-79175A, all of the plurality of lenses configuring the imaging lens are formed in a circular shape rotationally symmetrical about the optical axis and have a circular outline. The lens barrel thus has to have a cylindrical outline dependent on the outline size of the lenses. This is not limited to the imaging lens in JP 2015-79175A and is a common structure in general imaging lenses.

In addition, the imaging lens described in JP 2015-79175 A has a structure where the central axes (optical axes) of the plurality of lenses are aligned with each other by fitting the outline of each lens to the inner circumferential surface of the lens barrel, and thus it is difficult to accurately match the central axes of the lenses. Accordingly, there is a risk of performance degradation due to variation in dimensional tolerance of each member and assembly error.

The present invention has been made in view of the above problems, and it is an object thereof to provide an imaging lens having a lens to be accommodated in a lens barrel with an outline formed in a polygonal shape, thereby partially notching an outline of a lens barrel, which used to be in a cylindrical shape in the past, and being less likely to cause performance degradation due to assembly error.

To achieve the above object, an imaging lens according to the present invention includes: a lens provided with an effective optical surface and an edge region formed surrounding the effective optical surface; and a lens barrel configured to accommodate and hold the lens, and is configured in such a manner that the lens has the edge region with an outline formed in a polygonal shape, the lens barrel has an inner circumferential surface with at least one linear portion formed in a position to accommodate the lens, the at least one linear portion corresponding to at least one linear portion formed in an outline of the lens, and the lens barrel has an outline with a linear portion formed parallel to the linear portion formed in the inner circumferential surface of the lens barrel.

To achieve the above object, the imaging lens according to the present invention includes a configuration in which the imaging lens is composed of h a plurality of the lenses, and at least two lenses disposed on an object side have respective outlines formed in a polygonal shape with same number of vertices and are disposed in a same phase on an optical axis as a central axis of rotation.

To achieve the above object, the imaging lens according to the present invention includes that the lens has the edge region with the outline formed in a regular polygonal shape.

To achieve the above object, the imaging lens according to the present invention further includes a configuration in which each of the lenses has an annular inclined surface formed outside the effective optical surface on a surface facing each other, and the annular inclined surfaces are fitted to each other to align central axes of the lenses.

The present invention allows effective use of the space secured in a notched area by at least partially notching the outline of the lens barrel. It also allows prevention of performance degradation due to assembly error by fitting the plurality of lenses at the inclined surfaces formed respectively.

DETAILED DESCRIPTION OF THE PREFERRED EMBODIMENTS

With reference to FIGS. 1 through 8B, embodiments of the present invention are described.

Figure 1:
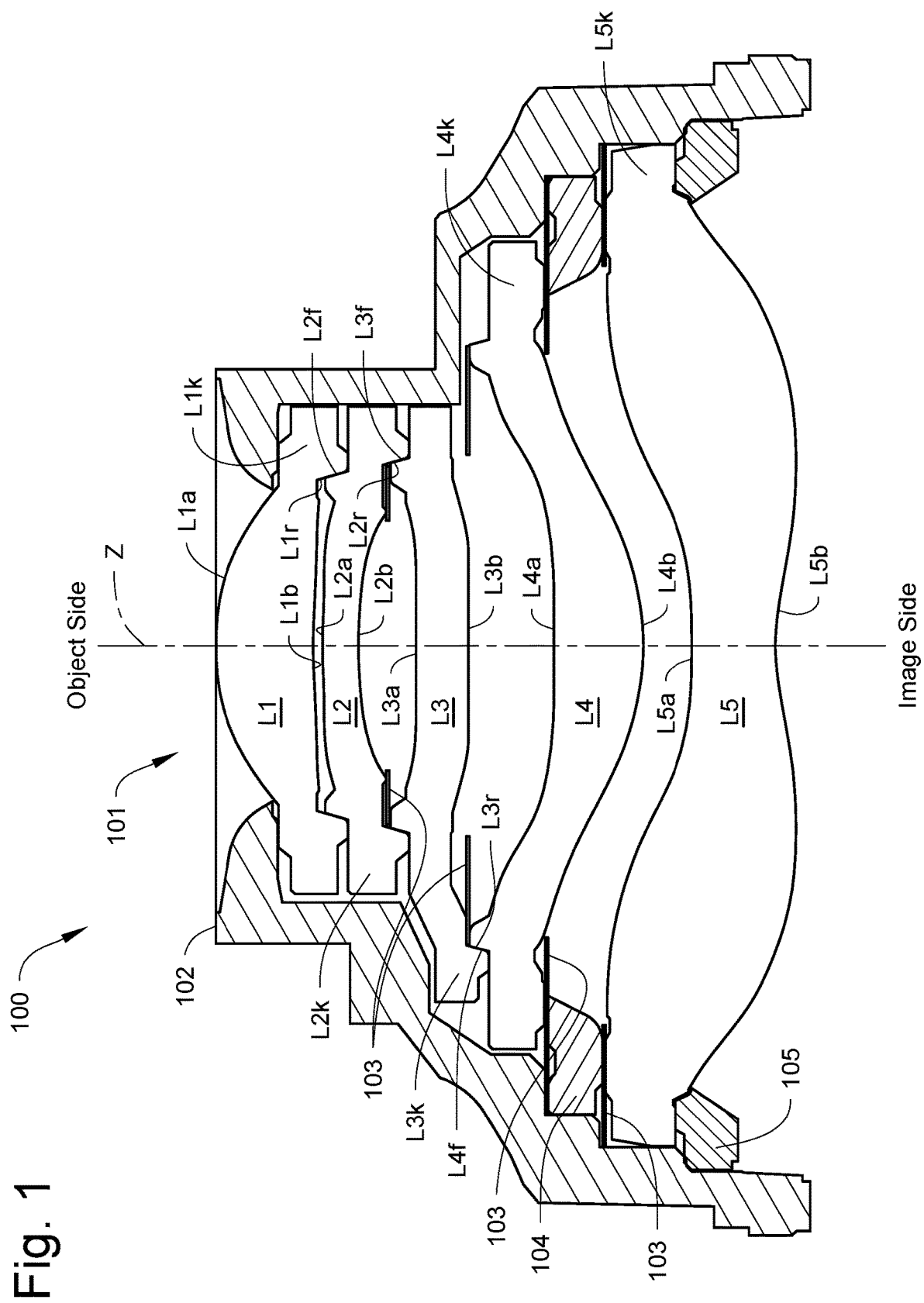
FIG. 1 is a diagram illustrating a configuration of an imaging lens according to an embodiment of the present invention.

FIG. 1 illustrates an imaging lens according to an embodiment of the present invention.

As illustrated in FIG. 1, an imaging lens 100 includes a lens portion 101 and a lens barrel portion 102.

The lens portion 101 is configured with five lenses of, in order from an object side (top of the drawing) to an image side (bottom of the drawing), a first lens L1, a second lens L2, a third lens L3, a fourth lens L4, and a fifth lens L5. Respective light shielding plates 103 are disposed between the second lens L2 and the third lens L3, between the third lens L3 and the fourth lens L4, and between the fourth lens L4 and the fifth lens L5. In addition, an intermediate ring 104 is disposed between the fourth lens L4 and the fifth lens L5, and a retaining ring 105 is disposed on the image side of the fifth lens L5.

The light shielding plates 103 are provided to shield undesired light generated inside the imaging lens 100. The intermediate ring 104 determines a space in an optical axis Z direction between the fourth lens L4 and the fifth lens L5. The retaining ring 105 shields undesired light emitted from outside a effective lens diameter.

Figure 2A:
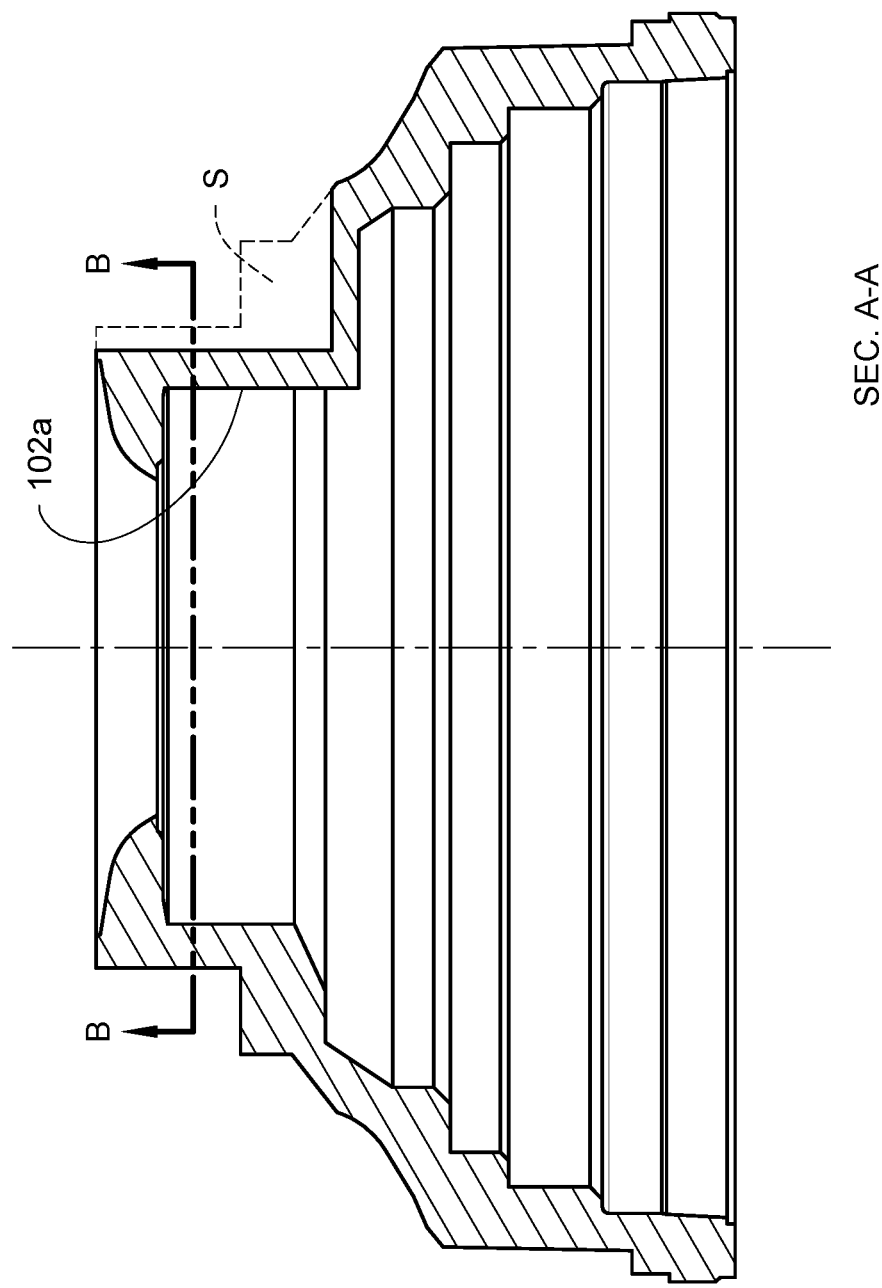
FIGS. 2A through 2C are cross-sectional views of a lens barrel of the imaging lens according to the above embodiment of the present invention.
Figure 2B:
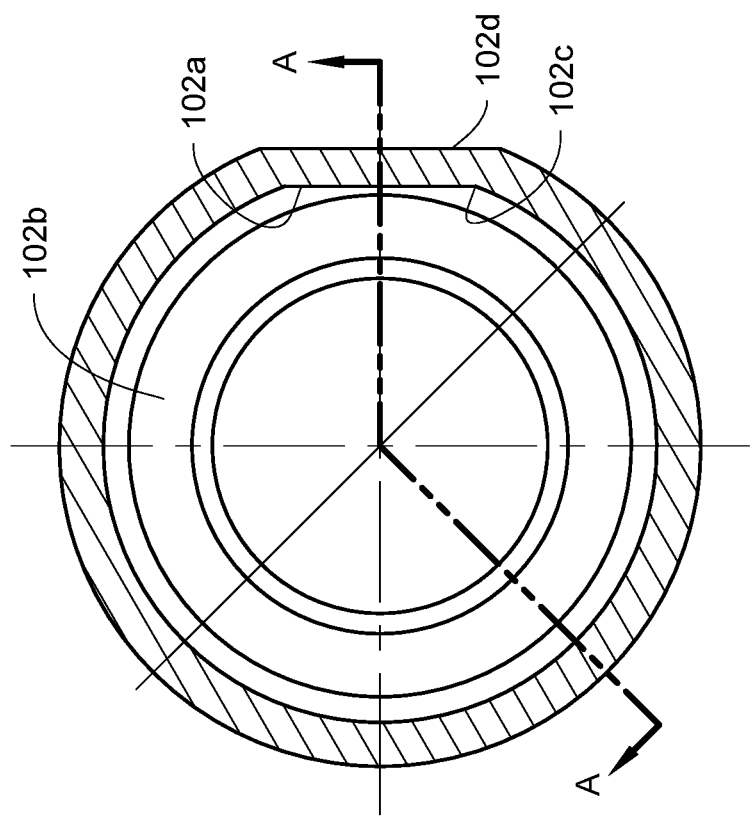
Figure 2C:
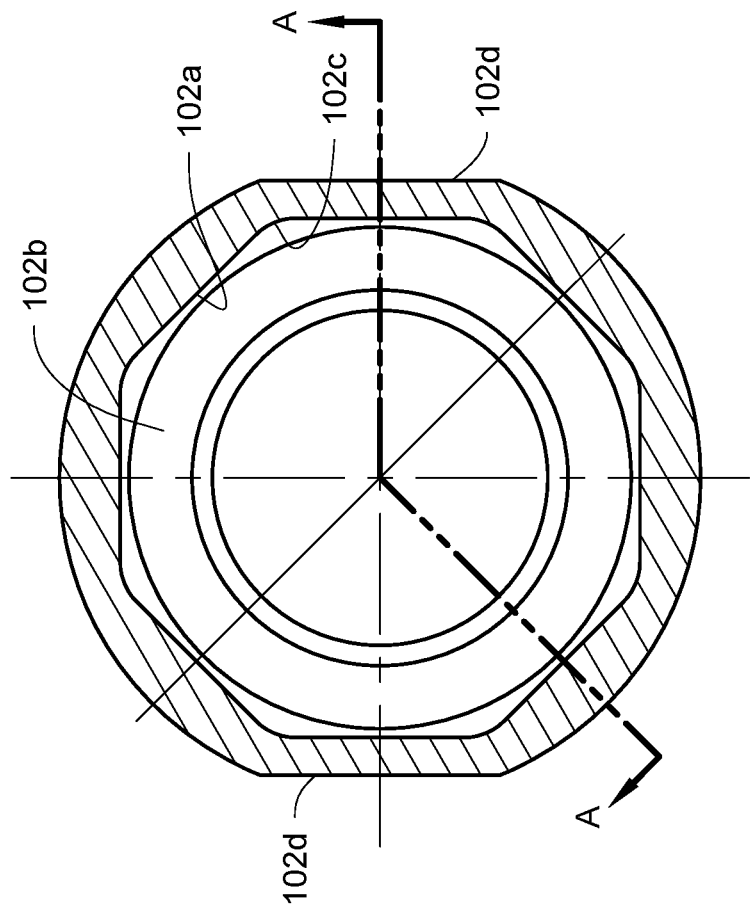

FIGS. 2A through 2C illustrate cross-sectional views of the lens barrel 102 in FIG. 1. FIG. 2A illustrates a cross-sectional view of the entire lens barrel 102, and FIGS. 2B and 2C illustrate examples of cross-sectional views of positions to insert the first lens L1 and the second lens L2 of the lens barrel 102.

Figure 3A:
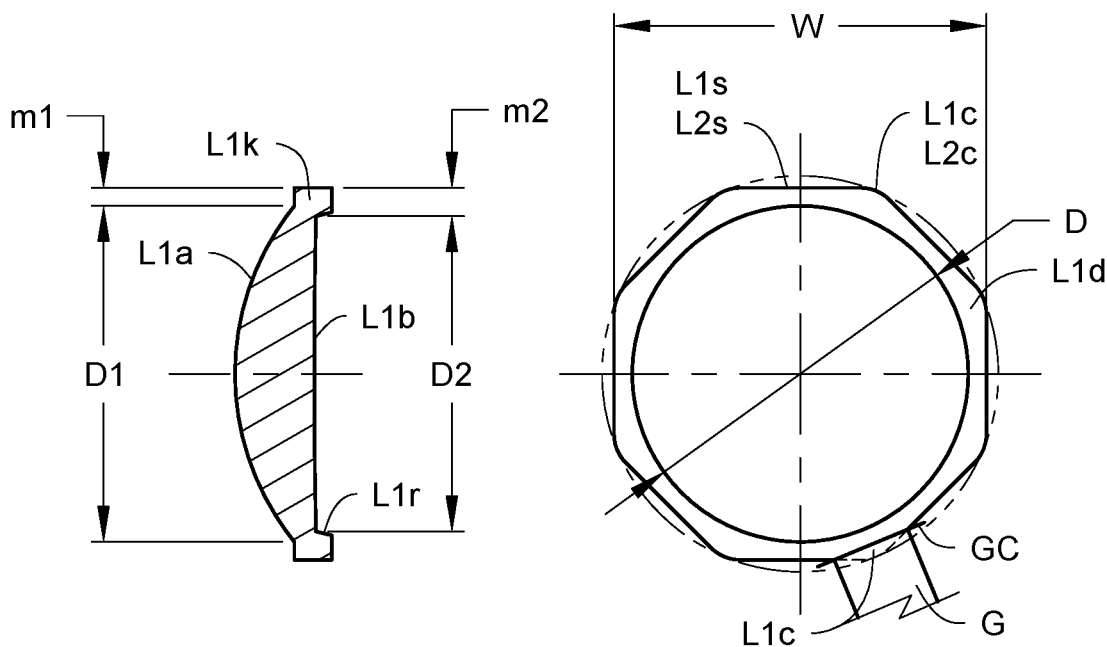
FIGS. 3A through 3E are diagrams illustrating lens shapes of the imaging lens according to the above embodiment of the present invention.

FIG. 3A schematically illustrates a lens shape in the present embodiment. The lenses in the present embodiment are formed by injection molding as seen from inclusion of a gate G.

As illustrated in FIG. 3A, the lens in the present embodiment includes effective optical surfaces L1a and L1b and an edge region L1k formed surrounding the effective optical surfaces L1a and L1b. The edge region L1k has an outer periphery formed in a regular octagonal shape. For minimum distances m1 and m2 between a linear portion L1s in the regular octagon and effective optical diameters D1 and D2, 0.1 mm or more is secured, respectively.

The gate G for injection molding is set in at least one vertex L1c of the regular octagon. The gate G is cut at a location GC, which is inside the regular octagon.

In general formation of a lens by injection molding, the residual stress is concentrated around the gate portion and thus the stress remains even inside the effective lens diameter around the gate and may cause partial degradation of resolution performance. In the present embodiment, the gate G is set in the vertex L1c of the regular octagon and thus the gate portion is away from the effective lens surfaces L1a and L1b, allowing reduction in generation of residual stress inside the effective lens diameter.

Figure 3B:
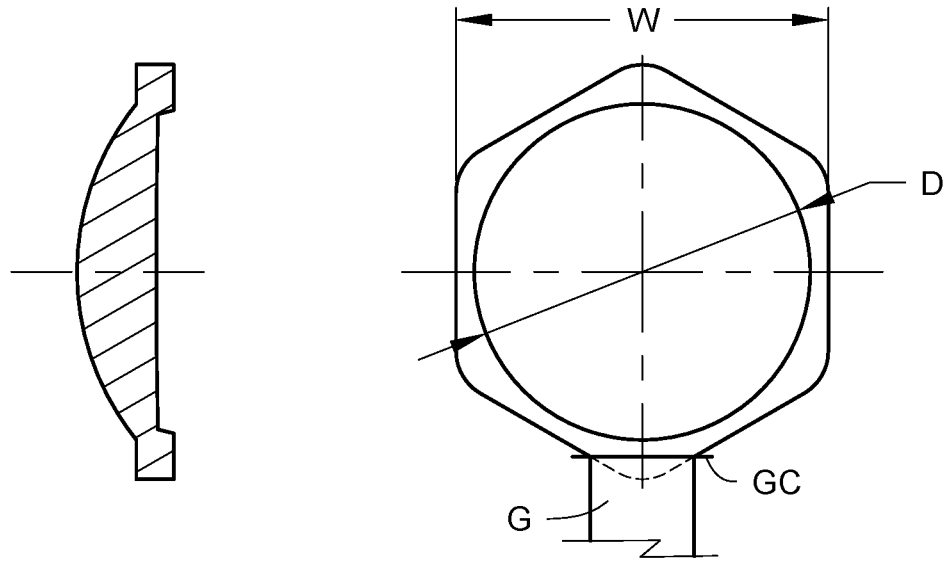
Figure 3C:
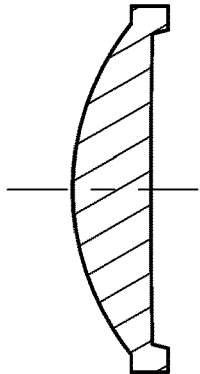
Figure 3C:
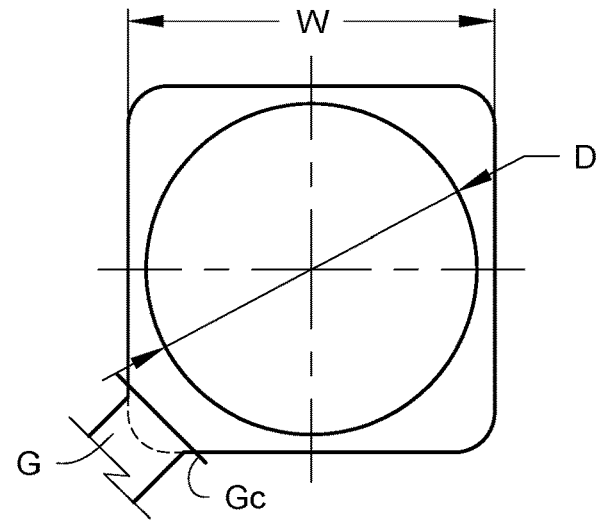
Figure 3D:
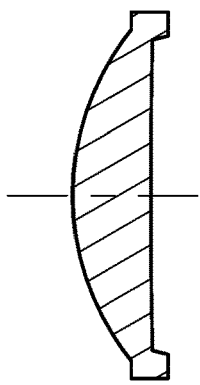
Figure 3D:
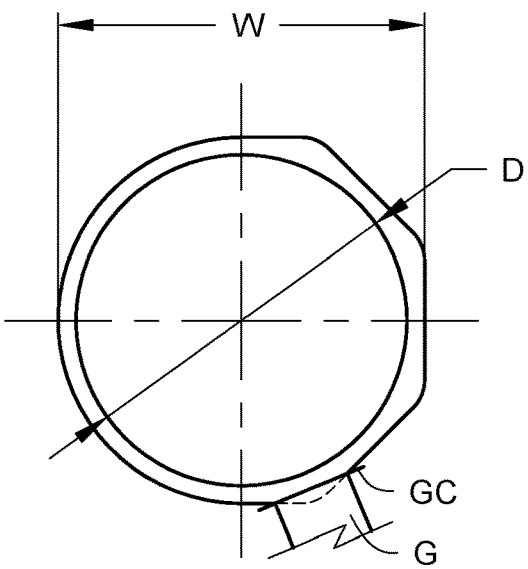
Figure 3E:
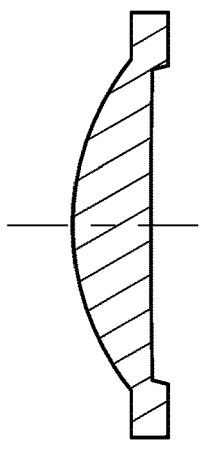
Figure 3E:
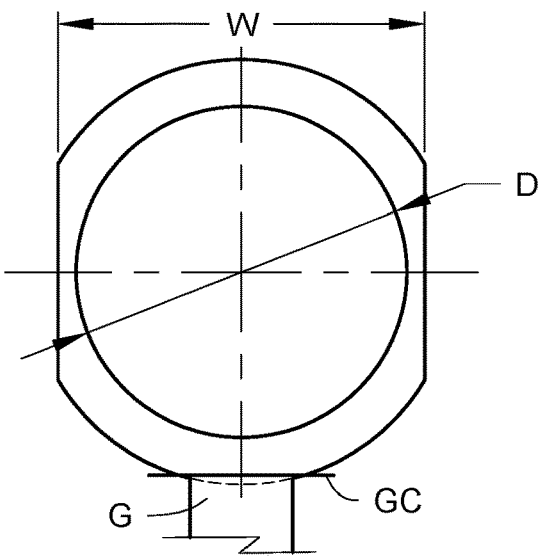

While FIG. 3A is an embodiment of the outline in a regular octagonal shape, the outline may be in a regular hexagonal shape as illustrated in FIG. 3B, may be in a square shape as illustrated in FIG. 3C, or may simply be in a polygonal shape. Moreover, as illustrated in FIG. 3D, the outline may be in a shape combining an annular outline and an outline partially formed with vertices.

The inner circumferential surface of the lens barrel 102 to insert the lenses described above is formed, as FIG. 2B, in a regular octagonal shape to match the outline of the lens. Another example of the inner circumferential surface may be, as FIG. 2C, in a shape having one linear portion that matches at least one linear portion in the outline of the lens. Forming in such a shape allows formation of a surface 102d, parallel to the linear portion of the inner circumferential surface, in the outline of the lens barrel 102.

Then, a method of assembling the imaging lens in the present embodiment.

Figure 4:
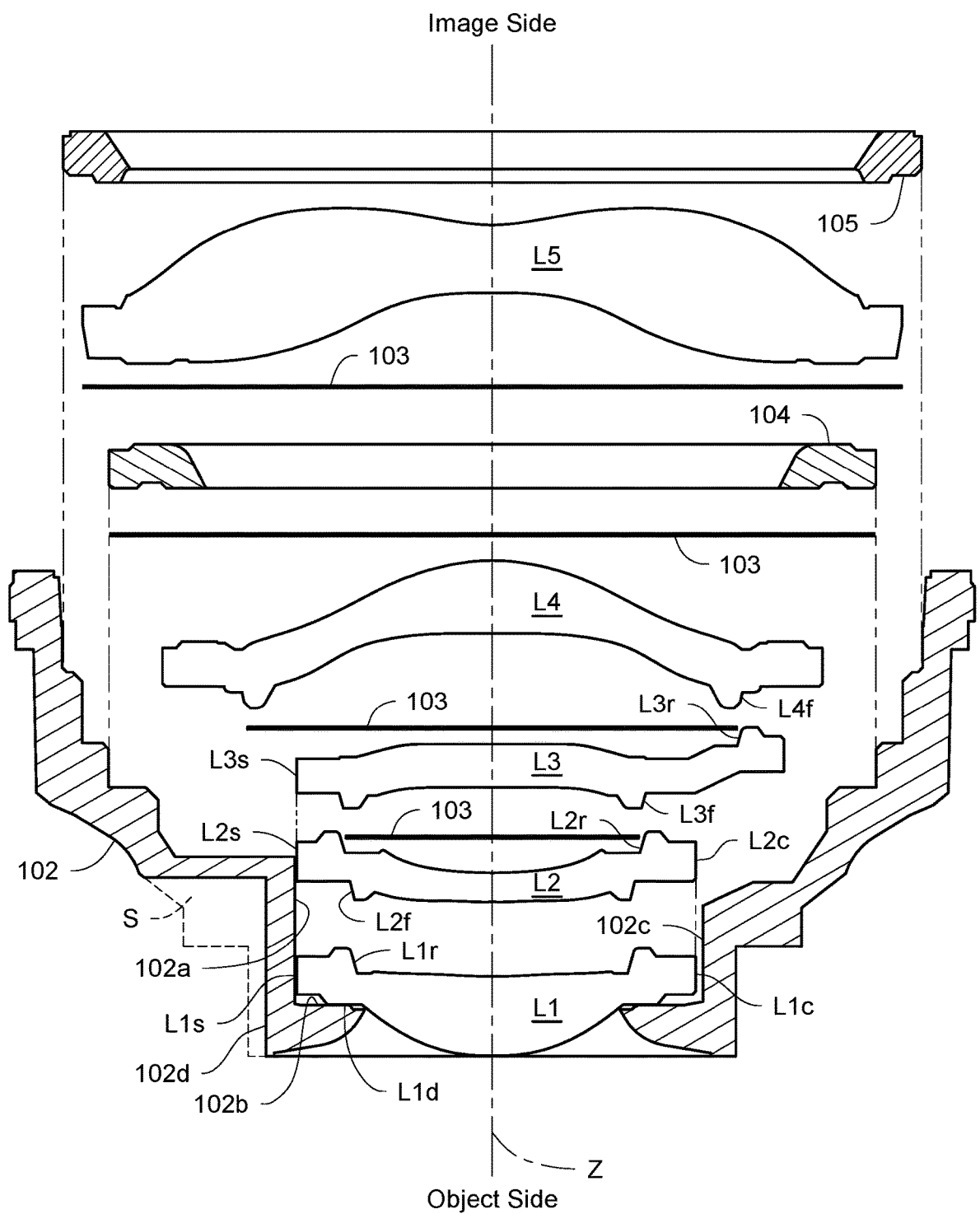
FIG. 4 is a diagram illustrating a method of assembling the imaging lens according to the above embodiment of the present invention.
Figure 5:
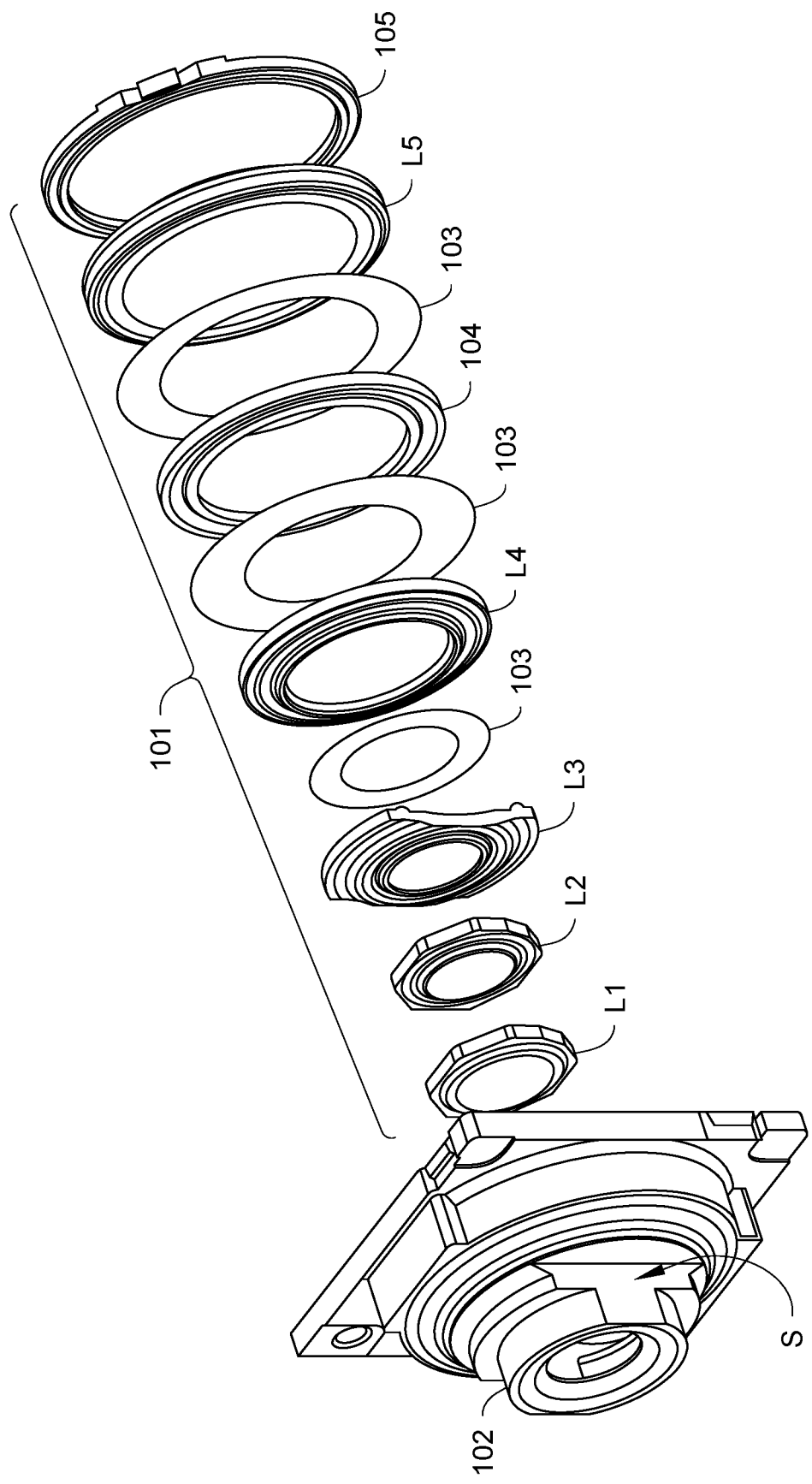
FIG. 5 is an exploded perspective view of the imaging lens according to the above embodiment of the present invention.
Figure 6:
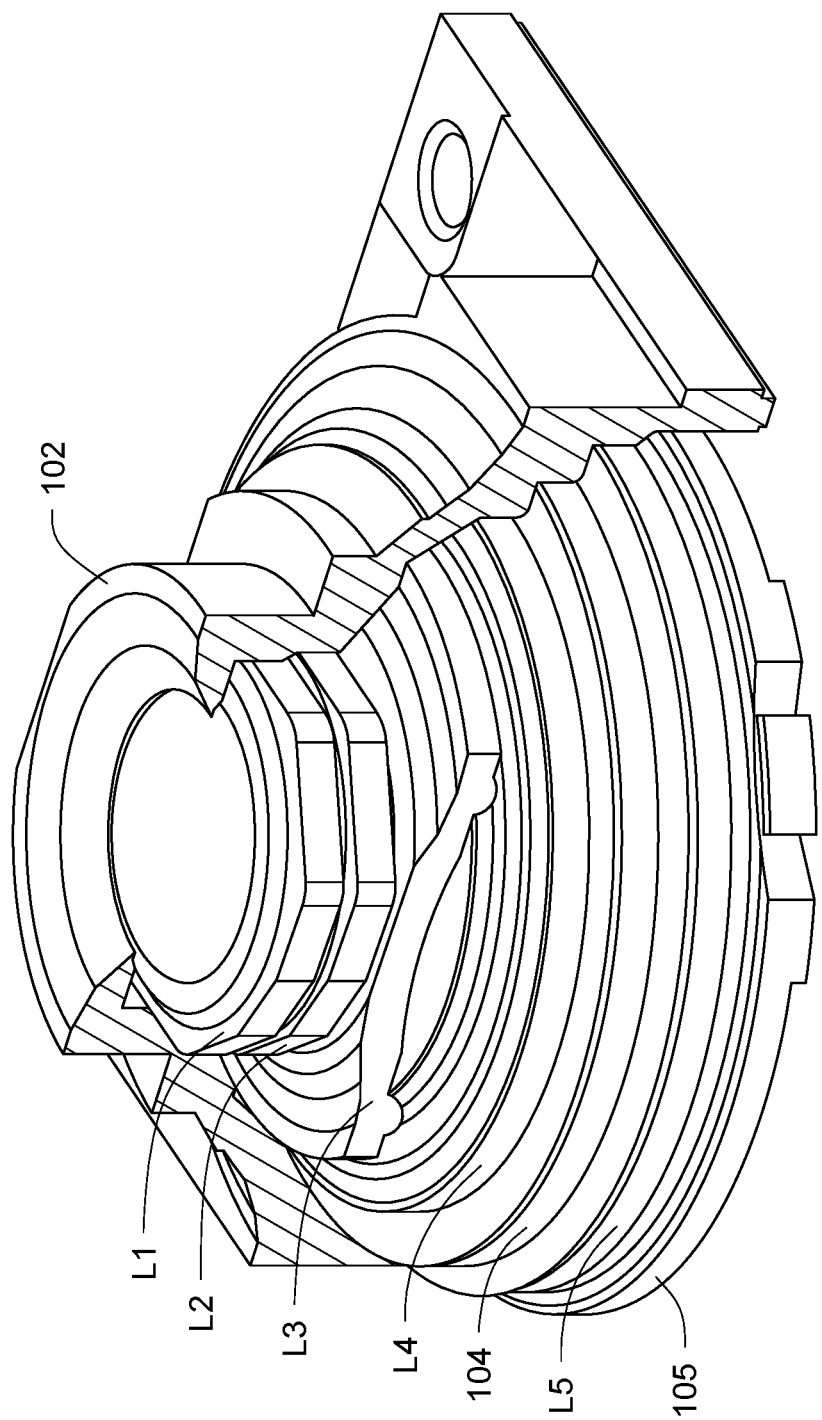
FIG. 6 is a structural view illustrating partial cross sections of FIG. 5.

FIG. 4 is an exploded view illustrating a method of assembling the imaging lenses in the present embodiment, FIG. 5 is an exploded perspective view in the present embodiment, and FIG. 6 is a perspective view illustrating an internal structure for assembling the lenses in FIG. 5.

The present embodiment is an example where both the first lens L1 and the second lens L2 have a regular octagonal outline of the same size. The third lens L3 is, as the example illustrated in FIG. 3E, in a shape obtained by cutting the edge region, outside the effective diameter of the lens, in parallel. A distance W between the opposite sides is same as a distance W between the opposite sides in the regular octagonal linear portion of the first lens L1 and the second lens L2.

As illustrated in FIG. 4, the lens barrel 102 is turned upside down to be positioned and placed on an assembly jig, not shown. Then, the first lens L1 is inserted by aligning the linear portion L1s in the outline of the first lens L1 with a linear portion 102a formed in the inner circumference of the lens barrel 102 and aligning the vertex L1c in the outline of the first lens L1 with a vertex 102c formed in the inner circumference of the lens barrel 102. Then, a receiving surface 102b of the lens barrel 102 receives an edge plane L1d of the first lens L1 to determine the position in the optical axis direction.

Then, the second lens L2 is inserted by aligning a linear portion L2s in the outline of the second lens L2 with the linear portion 102a formed in the inner circumference of the lens barrel 102 and aligning a vertex L2c in the outline of the second lens L2 with the vertex 102c formed in the inner circumference of the lens barrel 102. Accordingly, in the present embodiment, the respective outlines of the first lens L1 and the second lens L2 are in a matched phase about the optical axis Z as the central axis. That is, when projected on a plane orthogonal to the optical axis Z, the first lens L1 and the second lens L2 have the linear portions L1s and L2s in the respective outlines matched with the vertex L1c and L2c.

When the second lens L2 is placed on the first lens L1, an annular inclined surface L1r formed in the edge region on the image side of the first lens L1 is fitted to an annular inclined surface L2f formed in the edge region on the object side of the second lens L2. Accordingly, both lenses are built while the respective centers match the optical axis Z.

Then, the light shielding plate 103 is placed on the image side of the second lens L2, followed by insertion of the third lens L3 into the lens barrel 102. At this time as well, the third lens L3 is inserted by aligning a linear portion L3s in the outline of the third lens L3 with the linear portion 102a formed in the inner circumferential surface of the lens barrel 102. Accordingly, the third lens L3 is built while the linear portion formed in the outline of the third lens L3 matches the linear portions in the outlines of the first lens L1 and the second lens L2.

When the third lens L3 is placed on the second lens L2, an annular inclined surface L2r formed in the edge region on the image side of the second lens L2 is fitted to an annular inclined surface L3f formed in the edge region on the object side of the third lens L3. Accordingly, both lenses are built while the respective centers match the optical axis Z.

Then, the light shielding plate 103 is placed on the image side of the third lens L3, followed by insertion of the fourth lens L4 into the lens barrel 102. When the fourth lens L4 is placed on the third lens L3, an annular inclined surface L3r formed in the edge region on the image side of the third lens L3 is fitted to an annular inclined surface L4f formed in the edge region on the object side of the fourth lens L4. Accordingly, both lenses are built while the respective centers match the optical axis Z.

Then, the light shielding plate 103 is placed on the fourth lens L4, followed by insertion of the intermediate ring 104, insertion of the fifth lens L5, and finally insertion of the retaining ring 105.

By setting the diameter to be in the relationship of press fit to the lens barrel 102, the intermediate ring 104 allows the lens barrel 102 to hold the first lens L1 through the fourth lens L4 inside. In addition, by setting the diameter to be in the relationship of press fit to the lens barrel 102, the retaining ring 105 allows the lens barrel 102 to hold the intermediate ring 104 and the fifth lens L5 inside.

If the retaining ring 105 inserted lastly is the only mechanism to fix the structure inside the lens barrel 102, the structure is likely to be weak to an external force, such as falling and impact. Accordingly, in the present embodiment, a structure is employed where the intermediate ring 104 positioned in an intermediate area holds the four lenses on the object side and the retaining ring 105 holds the intermediate ring 104 and the fifth lens L5.

It should be noted that the intermediate ring 104 and the retaining ring 105 may be fixed by not only limited to press fit but using a method, such as adhesion and welding.

As described above, the imaging lens 100 in the present embodiment is in a shape where a region S illustrated by broken lines in the lens barrel 102 is cut off in the range of a height in the optical axis direction of the first lens L1 through the third lens L3. Accordingly, a space allowing device members to be disposed is provided in the region S.

FIGS. 5 and 6 are perspective views of the imaging lens in the present embodiment to clarify the structure.

Then, effects for applying the imaging lens in the present embodiment to a mobile terminal device are described.

Figure 7:
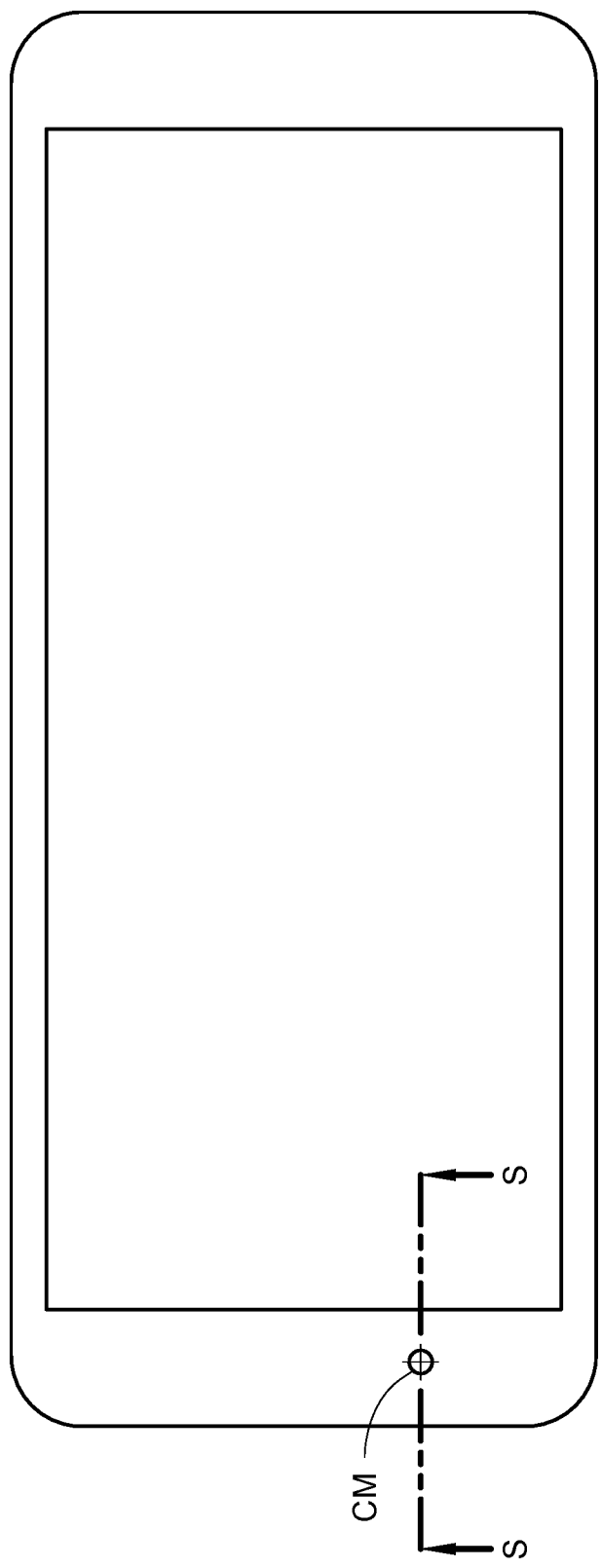
FIG. 7 is a schematic view of a mobile terminal device to mount the imaging lens of the present invention.
Figure 8A:
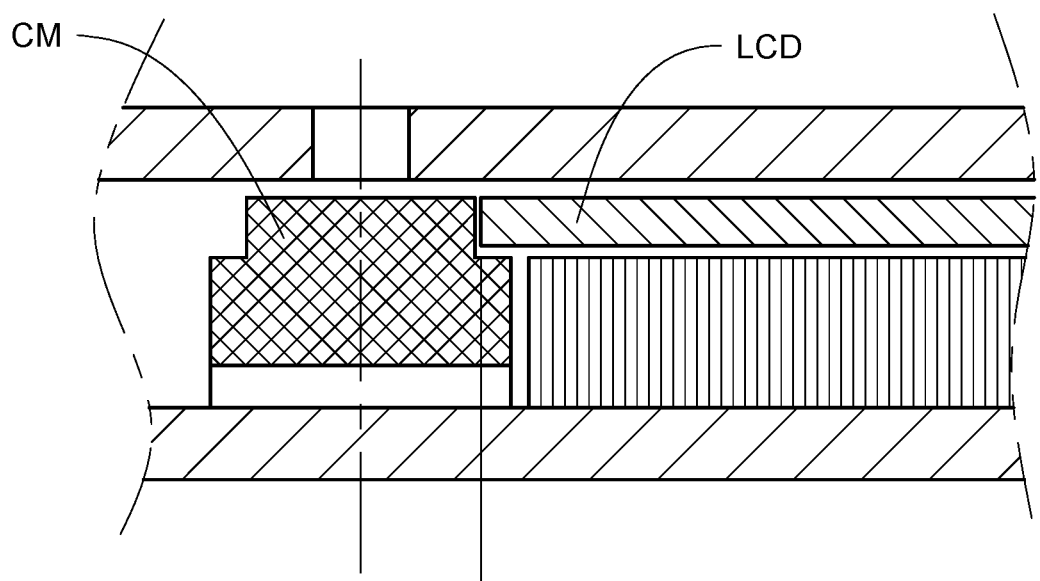
FIGS. 8A and 8B are schematic views illustrating partial cross sections of FIG. 7.
Figure 8B:
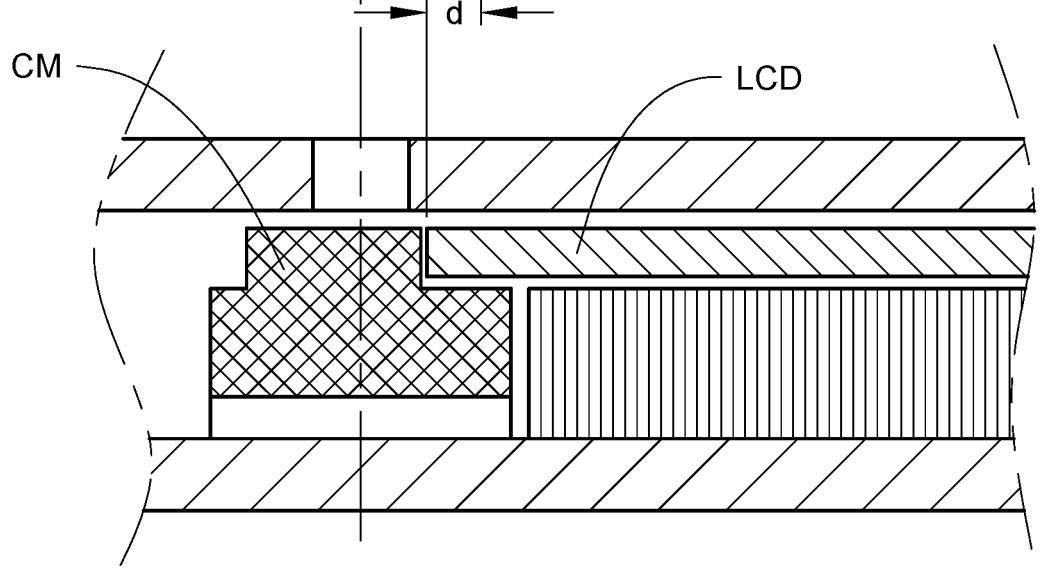

FIG. 7 is a schematic view of a smartphone taken from a liquid crystal panel side, where a camera module CM is built in the location illustrated by S-S. The camera module CM is a module configured with an imaging lens, an infrared blocking filter, and image sensors such as CCD and C-MOS sensors. FIGS. 8A and 8B are schematic views illustrating an S-S cross section of a camera module CM area in FIG. 7. FIG. 8A illustrates an example in the past, and FIG. 8B is an example of employing the imaging lens 100 in this embodiment of the present invention for the camera module CM.

The liquid crystal panel in FIG. 8A is a display LCD of, for example, a 16:9 size. This display LCD is laid out very close to the camera module CM. In this situation, to employ a display LCD greater than 16:9, for example, 18:9 while the outline size of the terminal device is kept, the display LCD interferes with the camera module CM and thus the outline of the mobile terminal has to be made larger.

In contrast, FIG. 8B is the example of employing the imaging lens 100 in this embodiment of the present invention for the camera module CM. The notched lens barrel secures the space illustrated by the dimension d. Accordingly, the display LCD of, for example, 18:9 is allowed to be built in without changing the outline size of the device.

As just described, the present embodiment allows a space to be provided inside a mobile terminal device implemented with high density, and thus allows, for example, a large display LCD to be mounted or a component to be disposed in the space without increasing the size of the device.

It should be noted that the present invention is not limited to the embodiments described above. The present invention is widely applicable to the technical field of imaging lenses. For example, the number of lens(es) to be accommodated in the lens barrel may be one, two, three, four, or six or more. The number of lens(es) with a polygonal outline may be one or all component lenses. The outline of the lens barrel may be in a shape geometrically similar to the polygonal shape of the outline of the lenses. As long as achieving the objects of the invention, various embodiments may be employed.

What is claimed is:

1. An imaging lens comprising: a lens provided with an effective optical surface and an edge region formed surrounding the effective optical surface; and a lens barrel configured to accommodate and hold the lens, wherein
the lens has the edge region with an outline formed in a regular polygonal shape,
the lens barrel has an inner circumferential surface with at least one linear portion formed in a position to accommodate the lens, the at least one linear portion corresponding to at least one linear portion formed in an outline of the lens,
the lens barrel has an outline with a linear portion formed parallel to the linear portion formed in the inner circumferential surface of the lens barrel;
the imaging lens comprises a plurality of lenses arranged from an object side to an image side along an optical axis and
of the plurality of lenses, at least the two lenses disposed furthest on the object side have respective outlines formed in a regular polygonal shape with the same number of vertices and disposed in the same phase on the optical axis as a central axis of rotation.

2. The imaging lens according to claim 1, wherein each of the lenses has an annular inclined surface formed outside the effective optical surface on a surface facing each other, and the annular inclined surfaces are fitted to each other to align central axes of the lenses.

3. The imaging lens according to claim 1, wherein each lens has a cut end of a gate for injection molding formed inside of a maximum outline of the polygonal shape in at least one vertex of the polygonal shape.

4. The imaging lens according to claim 1, wherein each lens has a minimum distance between the effective optical surface and the outline of the edge region is 0.1 mm or more.

5. A camera module comprising the imaging lens according to claim 1.

6. The imaging lens according to claim 1, wherein each lens has a cut end of a gate for injection molding formed inside of a maximum outline of the polygonal shape in at least one vertex of the polygonal shape.

7. The imaging lens according to claim 1, wherein each lens has a minimum distance between the effective optical surface and the outline of the edge region of 0.1 mm or more.

8. The imaging lens according to claim 1, wherein each of the lenses has an annular inclined surface formed outside the effective optical surface on a surface facing each other, and the annular inclined surfaces are fitted to each other to align central axes of the lenses.

* * * * *